United States Patent
Masuda et al.

(10) Patent No.: US 8,575,884 B2
(45) Date of Patent: Nov. 5, 2013

(54) MOTOR DRIVE CONTROL SYSTEM ENABLING CONNECTION OF DIRECT CURRENT/ALTERNATING CURRENT CONVERSION DEVICE

(75) Inventors: Naoki Masuda, Minamitsuru-gun (JP); Kiichi Inaba, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 20 days.

(21) Appl. No.: 13/438,232

(22) Filed: Apr. 3, 2012

(65) Prior Publication Data
US 2012/0256567 A1  Oct. 11, 2012

(30) Foreign Application Priority Data

Apr. 7, 2011 (JP) ................................. 2011-085632
Jan. 24, 2012 (JP) ................................. 2012-012400

(51) Int. Cl.
*H02P 27/04* (2006.01)

(52) U.S. Cl.
USPC ............... 318/800; 318/801; 318/77; 318/78; 318/255

(58) Field of Classification Search
USPC ............... 318/800, 801, 77, 78, 255
See application file for complete search history.

(56) References Cited

U.S. PATENT DOCUMENTS

| | | | |
|---|---|---|---|
| 6,198,613 B1 * | 3/2001 | Rozman | 361/93.1 |
| 6,914,790 B2 * | 7/2005 | Matsubara et al. | 363/34 |
| 2006/0208660 A1 * | 9/2006 | Shinmura et al. | 315/209 R |

FOREIGN PATENT DOCUMENTS

| | | |
|---|---|---|
| JP | 05-022837 | 1/1993 |
| JP | 2000-343117 | 12/2000 |
| JP | 2002-199792 | 7/2002 |
| JP | 2002-218779 | 8/2002 |
| JP | 2002-272153 | 9/2002 |
| JP | 2002-291274 | 10/2002 |
| JP | 3626152 | 3/2005 |
| JP | 2010-142049 | 6/2010 |

* cited by examiner

*Primary Examiner* — Erick Glass
(74) *Attorney, Agent, or Firm* — Drinker Biddle & Reath LLP (57) ABSTRACT

A motor drive control system connected to an alternating current/direct current conversion circuit which converts alternating-current voltage or alternating current to direct-current voltage or direct current are provided. A control circuit controls supply or stop of the supply of the direct-current voltage or direct current from the alternating current/direct current conversion circuit to the first number of first direct current/alternating current conversion circuits and the second number of second direct current/alternating current conversion circuits while maintaining the total of the outputs of the first number of motors and the outputs of the second number of motors at a certain power not more than power which can be supplied from the alternating current/direct current conversion circuit.

5 Claims, 4 Drawing Sheets

MOTOR DRIVE CONTROL SYSTEM ENABLING CONNECTION OF DIRECT CURRENT/ALTERNATING CURRENT CONVERSION DEVICE

RELATED APPLICATION DATA

This application claims priority under 35 U.S.C. §119 and/or §365 Japanese Application No. 2011-085632 filed Apr. 7, 2011, and Japanese Application No. 2010-012400 filed Jan. 24, 2012, the entire contents of which are incorporated herein by reference.

BACKGROUND OF THE INVENTION

1. Field of the Invention

The present invention relates to a motor drive control system which drives and controls at least one motor which is provided at an axis of a machine tool, industrial machine, robot, etc.

2. Description of the Related Art

In such a motor drive control system, in order to control rotational speed of a motor, alternating-current voltage or alternating current from a commercial alternating current power supply such as a three-phase alternating current power supply is converted once into direct-current voltage or direct current, then the direct-current voltage or the direct current is converted into any frequency alternating-current voltage or alternating current, then the converted alternating-current voltage or the converted alternating current is supplied to the motor. To do this, the motor drive control system is connected to one alternating current/direct current (AC/DC) conversion circuit which converts alternating-current voltage or alternating current to direct-current voltage or direct current and has at least one direct current/alternating current (DC/AC) conversion circuit which converts direct-current voltage or direct current to alternating-current voltage or alternating current and supplies the converted alternating-current voltage or alternating current to the motor.

Conventionally, in order to add a motor which can be driven and controlled by the motor drive control system, a motor drive control system which enables connection of one or more DC/AC conversion devices at the outside of the motor drive control system has been proposed, for example, in Japanese Patent No. 3626152 (JP3626152B). In this case, the DC/AC conversion device converts direct-current voltage or direct current into alternating-current voltage or alternating current and supplies the converted alternating-current voltage or the converted alternating current to the motor which is added to the motor drive control system so as to enable the motor which was added to the motor drive control system to be driven and controlled by the DC/AC conversion device. When a DC/AC conversion device is connected to such a motor drive control system, the AC/DC conversion circuit supplies direct-current voltage or direct current to at least one direct current/alternating current conversion circuit and at least one direct current/alternating current conversion device.

In a conventional motor drive control system which enables connection of a DC/AC conversion device, when one or more DC/AC conversion devices are connected to the motor drive control system, and a motor connected to a DC/AC conversion device is driven, because of large output of the motor connected to the DC/AC conversion device (for example, the output of the motor which is connected to the DC/AC conversion circuit of the motor drive control system), there may be a situation where the total of the outputs of the motors to be driven exceeds power which can be supplied from the AC/DC conversion circuit. Therefore, according to a conventional motor drive control system which enables connection of a DC/AC conversion device, there is a disadvantage of overloading the AC/DC conversion circuit when the total of the outputs of the motors to be driven exceeds power which can be supplied from the AC/DC conversion circuit.

SUMMARY OF INVENTION

An object of the present invention is to provide a motor drive control system which enables connection of a DC/AC conversion device wherein even when an output of a motor connected to a DC/AC conversion device which is connected to the motor drive control system is large, it is possible to avoid a situation where the AC/DC conversion circuit is overloaded.

One aspect of the motor drive control system is a motor drive control system connected to an alternating current/direct current conversion circuit which converts alternating-current voltage or alternating current to direct-current voltage or direct current, including: a first number of first direct current/alternating current conversion circuits to which direct-current voltage or direct current is supplied from the alternating current/direct current conversion circuit, which convert the supplied direct-current voltage or the supplied direct current into alternating-current voltage or alternating current, and which supply the converted alternating-current voltage or the converted alternating current to a first number of motors; a connection unit which enables connection of a second number of second direct current/alternating current conversion circuits which convert direct-current voltage or direct current to alternating-current voltage or alternating current and which supply the converted alternating-current voltage or the converted alternating current to a second number of motors so that the alternating current/direct current conversion circuit enables supply of direct-current voltage or direct current to at least one of at least one first direct current/alternating current conversion circuit and at least one second direct current/alternating current conversion circuit; and a control circuit which controls supply or stopping of the supply of direct-current voltage or direct current from the alternating current/direct current conversion circuit to the first number of first direct current/alternating current conversion circuits and the second number of second direct current/alternating current conversion circuits while maintaining the total of the outputs of the first number of motors and the outputs of the second number of motors at a certain power not more than power which can supplied from the alternating current/direct current conversion circuit in the case where it is predicted that the total of the outputs of the first number of motors and the outputs of the second number of motors, when at least one second direct current/alternating current conversion circuits is connected to the connection unit, will exceed the power which can be supplied from the alternating current/direct current conversion circuit.

Preferably, in the case where it is predicted that the total of the outputs of the first number of motors and the outputs of the second number of motors, when at least one second direct current/alternating current conversion circuit is connected to the connection unit, will exceed the power which can be supplied from the alternating current/direct current conversion circuit, the control circuit stops the supply of the direct-current voltage or the direct current to at least one of at least one first direct current/alternating current conversion circuit and at least one second direct current/alternating current conversion circuit to which the motors to be driven among the first number of motors and the second number of motors are connected.

Preferably, in the case where it is predicted that the total of the outputs of the first number of motors and the outputs of the second number of motors, when at least one second direct current/alternating current conversion circuits is connected to the connection unit, will exceed the power which can be supplied from the alternating current/direct current conversion circuit, the control circuit controls the supply of the direct-current voltage or the direct current so as to restrict at least one output of the motors to be driven among the first number of motors and the second number of motors.

Preferably, when at least one second direct current/alternating current conversion circuits is connected to the connection unit, the control circuit predicts the total of the outputs of the first number of motors and the outputs of the second number of motors based on a position command, a rotational speed command, or a torque command for each of the first number of motors and a position command, a rotational speed command, or a torque command for the second number of motors from devices at the outside of the motor drive control system.

Preferably, when at least one second direct current/alternating current conversion circuits is connected to the connection unit, the control circuit predicts the total of the outputs of the first number of motors and the outputs of the second number of motors based on the operating states of the first number of motors and the second number of motors.

Another aspect of a motor drive control system is a motor drive control device having a first direct current/alternating current conversion circuit which converts direct-current voltage or direct current into alternating-current voltage or alternating current and supplies the converted alternating-current voltage or the converted alternating current to a first motor, wherein the motor drive control system further has a direct current/alternating current conversion device connecting means which enable connection of a direct current/alternating current conversion device at the outside of the motor drive control system, the direct current/alternating current conversion device has a second direct current/alternating current conversion circuit which converts direct-current voltage or direct current into alternating-current voltage or alternating current and supplies the converted alternating-current voltage or the converted alternating current to a second motor, and, when the direct current/alternating current conversion device is connected to the motor drive control system, the direct current/alternating current conversion device connecting means enable supply of direct-current voltage or direct current to the direct current/alternating current conversion device at the time of stopping the first motor. Note that, the direct current/alternating current conversion device connecting means are, for example, comprised of a communication port, a terminal block, and a control circuit.

Preferably, when the direct current/alternating current conversion device are connected to the motor drive control system, the direct current/alternating current conversion device connecting means enable supply of direct-current voltage or direct current instantaneously to the direct current/alternating current conversion device at the time of driving the first motor.

Preferably, the first motor is a spindle motor or a servo motor.

Preferably, the second motor is at least one of a motor for a rotary tool of a lathe which has a tool post and a motor for a back spindle.

Preferably, the second motor is at least one of a motor for exchanging a tool of a machining center and a motor for exchanging a work pallet.

Preferably, the motor drive control system further has an alternating current/direct current conversion circuit which converts alternating-current voltage or alternating current to direct-current voltage or direct current, and the alternating current/direct current conversion circuit and first direct current/alternating current conversion circuit are configured by a single module.

Another aspect of a motor drive control system is a motor drive control system having a first direct current/alternating current conversion circuit which converts direct-current voltage or direct current to alternating-current voltage or alternating current and supplies the converted alternating-current voltage or the converted alternating current to a first motor, wherein the motor drive control system further has a direct current/alternating current conversion device connecting means which enable connection of a direct current/alternating current conversion device at the outside of the motor drive control system, the direct current/alternating current conversion device has a second direct current/alternating current conversion circuit which converts direct-current voltage or direct current to alternating-current voltage or alternating current and supplies the converted alternating-current voltage or the converted alternating current to a second motor, when the direct current/alternating current conversion device is connected to the motor drive control system, the direct current/alternating current conversion device connecting means enable supply of direct-current voltage or direct current to the direct current/alternating current conversion device at the time of driving the first motor, and the motor drive control system restricts at least one of the output of the first motor and output of the second motor based on the operating states of the first motor and the second motor.

Preferably, the motor drive control system further has an output calculation circuit which calculates the output of the first motor and the output of the second motor.

Preferably, the direct current/alternating current conversion device connecting means restricts at least one of the output of the first motor and output of the second motor in accordance with commands from the outside.

Preferably, the direct current/alternating current conversion device connecting means restrict at least one of the output of the first motor and output of the second motor based on a rotational speed command for the first motor and a rotational speed command for the second motor.

Preferably, the motor drive control system further has an alternating current/direct current conversion circuit which converts alternating-current voltage or alternating current to direct-current voltage or direct current, and the alternating current/direct current conversion circuit and first direct current/alternating current conversion circuit are configured by a single module.

According to one aspect of the motor drive control system, in the case where it is predicted that the total of the outputs of the first number of motors and the outputs of the second number of motors, when at least one direct current/alternating current conversion device is connected to the connection unit, will exceed the power which can be supplied from the alternating current/direct current conversion circuit, the control circuit controls supply or stop of the supply from the alternating current/direct current conversion circuit to the first number of direct current/alternating current conversion circuits and second number of direct current/alternating current conversion devices while maintaining the total of the outputs of the first number of motors and the outputs of the second number of motors at a certain power not more than power which can be supplied from the alternating current/direct current conversion circuit. Due to this, even if the outputs of the motors connected to the direct current/alternating current conversion devices which are connected to the motor drive control system are large, it is possible to avoid a situation where the alternating current/direct current conversion circuit is overloaded.

BRIEF DESCRIPTION OF THE DRAWINGS

The objects, features, and advantages of the present invention will become more apparent from the following description of embodiments in connection with the accompanying drawings, in which.

DESCRIPTION OF THE PREFERRED EMBODIMENTS

The embodiments of the motor drive control system according to the present invention are described below, in detail, with reference to the accompanying drawings. In the drawings, the same components are denoted by the same reference numerals.

Figure 1:
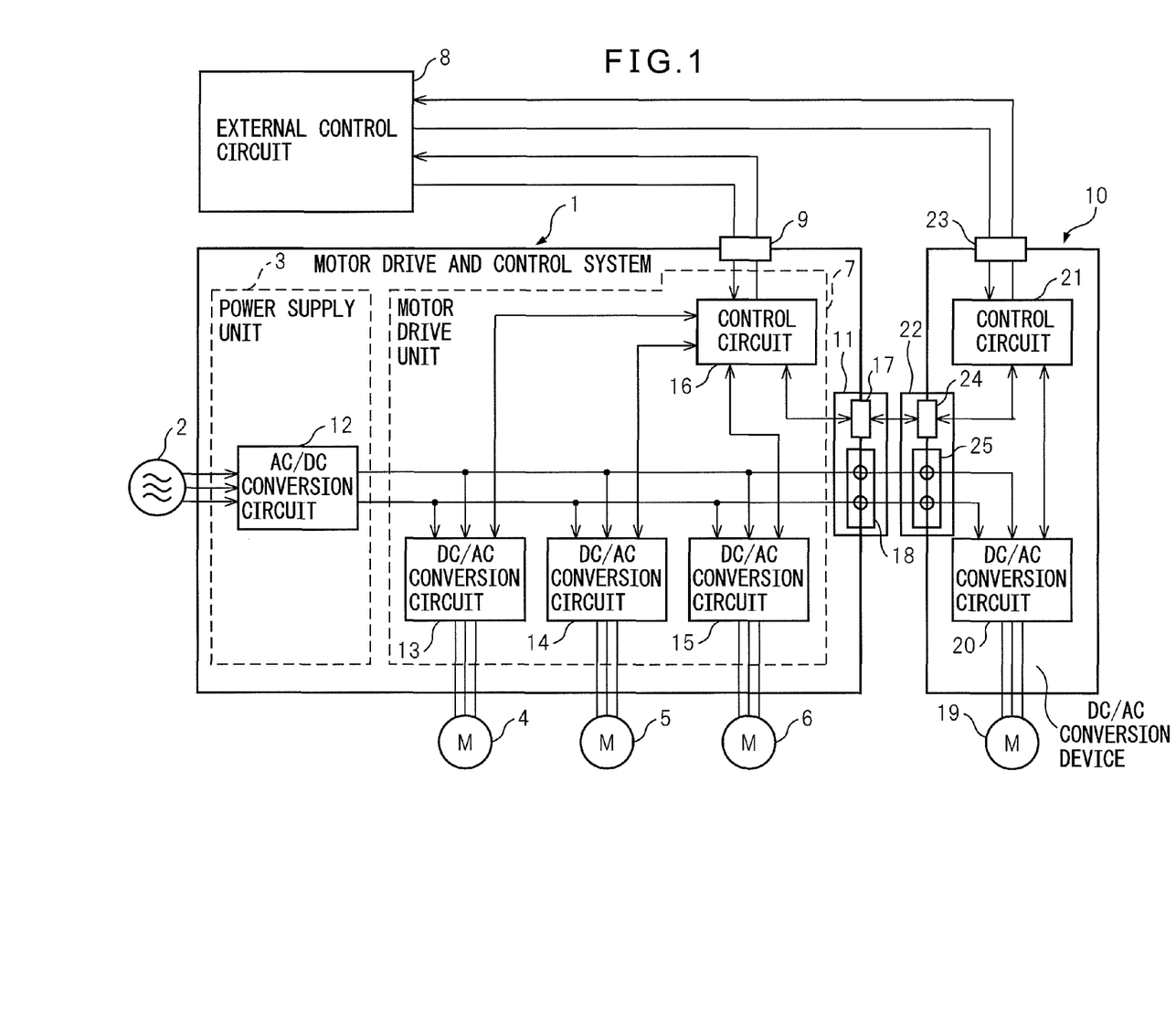
FIG. 1 is a block diagram of a first embodiment of a motor drive control system according to the present invention.

Referring to the drawings, FIG. 1 is a block diagram of a first embodiment of the motor drive control system according to the present invention. In FIG. 1, the motor drive control system 1 has a power supply unit 3 connected to a commercial alternating current power supply comprised of a three-phase alternating current power supply 2, a motor drive unit 7 which drives three motors 4, 5, and 6 as a first number of motors, a communication port 9 for transmitting and receiving signals to and from an external control circuit 8 which functions as a higher control device such as a computerized numeral control (CNC), a robot control device, etc., and a connection unit 11 which enables connection of a DC/AC conversion device 10 at the outside of the motor drive control system 1.

The power supply unit 3 has an AC/DC conversion circuit 12 which converts alternating-current voltage or alternating current supplied from the three-phase alternating current power supply 2 to direct-current voltage or direct current. The motor drive unit 7 has DC/AC conversion circuits 13, 14, and 15 as a first number of first direct current/alternating current conversion circuits and a control circuit 16. Note that, in the present embodiment, the AC/DC conversion circuit 12 and the DC/AC conversion circuits 13, 14, and 15 are configured by a single module.

The connection unit 11 enables connection of the DC/AC conversion device 10 so that the AC/DC conversion circuit 12 enables supply of direct-current voltage or direct current to at least one of at least one DC/AC conversion circuit 13, 14, or 15 and the DC/AC conversion device 10. To do this, the connection unit 11 has a communication port 17 for transmitting and receiving signals to and from the DC/AC conversion device 10 at the outside of the motor drive control system 1 and a terminal block 18 which enables electrical connection of the motor drive control system 1 to the DC/AC conversion device 10. In FIG. 1, the state where the DC/AC conversion device 10 is connected to the connection unit 11 is shown, but the connection unit 11 is attachable to and detachable from the DC/AC conversion device 10.

Each of the DC/AC conversion circuits 13, 14, and 15 corresponds to each of the motors 4, 5, and 6 of the control axes provided at a machine tool (for example, lathe) or an industrial machine (for example, machining center) to be controlled. Therefore, the DC/AC conversion circuits 13, 14, and 15 convert direct-current voltage or direct current supplied from the AC/DC conversion circuit 12 to any frequency alternating-current voltage or any frequency alternating current, supply the converted alternating-current voltage or the converted alternating current to the motors 4, 5, and 6, and drive the motors 4, 5, and 6. In the present embodiment, the motor 4 is a spindle motor while the motors 5 and 6 are servo motors, but the motors 4, 5, and 6 may also be any other motors used in the machine tool or the industrial machine.

The control circuit 16 is, for example, comprised of a CPU and has various control circuits such as a rotational speed control circuit which controls the rotational speeds of each of the motors 4, 5, and 6 and a current control circuit which controls the current supplied to each of the motors 4, 5, and 6. Thereby, the control circuit 16 receives commands from the external control circuit 8, control signals and status signals from the DC/AC conversion device 10, status signals from the DC/AC conversion circuits 13, 14, and 15, commands from an operating unit (not shown), etc., and based these commands, control signals, status signals, etc., drives the motors 4, 5, and 6, that is, performs various controls such as supply of the direct-current voltage or the direct current to the DC/AC conversion circuits 13, 14, and 15, supply of the direct-current voltage or the direct current to the DC/AC conversion device 10, etc.

The DC/AC conversion device 10 drives a single motor 19 as a second number of motors for driving each of peripheral axes which is each of control axes of equipments or facilities arranged around a controlled object. For this reason, the DC/AC conversion device 10 has a single DC/AC conversion circuit 20 as a second number of second direct current/alternating current conversion circuits, a control circuit 21, a connection unit 22 which enables connection of the connection unit 11, and a communication port 23 for transferring signals with the outside control circuit 8.

The DC/AC conversion circuit 20 converts the direct-current voltage or the direct current supplied from the motor drive control system 1 to any frequency alternating-current voltage or any frequency alternating current, supplies the converted alternating-current voltage or the converted alternating current to the motor 19, and drives the motor 19. The control circuit 21 receives commands from the external control circuit 8, control signals from the motor drive control system 1, status signals from the DC/AC conversion circuit 20, commands from the operating unit (not shown), etc., and based on these commands, control signals, status signals, etc., drives the motor 19, that is, performs various controls such as supply of the direct-current voltage or the direct current to the DC/AC conversion circuit 20.

The connection unit 22 enables connection of the connection unit 11 so that the AC/DC conversion circuit 12 enable supply of the direct-current voltage or the direct current to at least one of at least one DC/AC conversion circuit 13, 14, or 15 and the DC/AC conversion devices 10. To do this, the connection unit 22 has a communication port 24 for transmitting and receiving signals to and from the motor drive control system 1 through the communication port 17 and a terminal block 25 which enable electrical connection of the DC/AC conversion device 10 to the motor drive control system 1 through the terminal block 18.

In the present embodiment, the motor 19 is one of a motor for a rotary tool of a lathe which has one tool post and a motor for a back spindle or one of a motor for exchanging a tool of a machining center and a motor for exchanging a work pallet, but the motor 19 may also be any other motors for driving a peripheral axis which is a control axis of an equipment or a facility arranged around a machine tool or an industrial machine.

According to the present embodiment, when the terminal block 18 is electrically connected to the terminal block 25, that is, when the DC/AC conversion circuit 20 is connected to the connection unit 11, based on commands from the external control circuit 8 or the operating unit (not shown) which are based on the configuration of the machine tool or the industrial machine controlled by the motor drive control system 1, the control circuit 16 predicts the total of the outputs of the motors 4, 5, 6, and 19 based on a position command, a rotational speed command, or a torque command from devices (the external control circuit 8, the operating unit (not shown), etc.) at the outside of the motor drive control system to the motors 4, 5, 6, and 19.

Then, the control circuit 16 compares the predicted total of the outputs of the motors 4, 5, 6, and 19 with the power which can be supplied from the AC/DC conversion circuit 12. Note that, information relating to the power which can be supplied from the AC/DC conversion circuit 12 is supplied from the AC/DC conversion circuit 12 to the control circuit 16 each time the control circuit 16 compares the total of the outputs of the motors with the power which can be supplied from the AC/DC conversion circuit 12. When it is predicted that the total of the outputs of the motors 4, 5, 6, and 19 will exceed the power which can be supplied from the AC/DC conversion circuit 12, the control circuit 16 controls supply or stopping of the supply of the direct-current voltage or the direct current from the AC/DC conversion circuit 12 to the DC/AC conversion circuits 13, 14, 15, and 20 while maintaining the total of the outputs of the motors 4, 5, 6, and 19 at a certain power not more than power which can be supplied from the AC/DC conversion circuit 12. To do this, the control circuit 16 stops the supply of the direct-current voltage or the direct current to at least one of the DC/AC conversion circuits 13, 14, 15, and 20 to which the motors to be driven (for example, the motors 4, 5, and 19) among the motors 4, 5, 6, and 19 are connected.

Here, the case where the motors to be driven are the motors 4, 5, and 19 and the output of the motor 19 is larger than the total of the outputs of the motors 4 and 5, so the total of the outputs of the motors 4, 5, and 19 exceeds the power which can be supplied from the AC/DC conversion circuit 12, and it is predicted that both the total of the outputs of the motors 4 and 5 and the output of the motor 19 will be a certain power not more than power which can be supplied from the AC/DC conversion circuit 12, will be explained. In this case, first, the control circuit 16 performs control to supply the direct-current voltage or the direct current to the DC/AC conversion circuit 20 so as to drive the motor 19 and to stop the supply of the direct-current voltage or the direct current to the DC/AC conversion circuits 13 and 14 so as to stop the drive of the motors 4 and 5. After the processing performed by the drive of the motor 19 ends, the control circuit 16 performs control to supply the direct-current voltage or the direct current to the DC/AC conversion circuits 13 and 14 so as to drive the motors 4 and 5 and to stop the supply of the direct-current voltage or the direct current to the DC/AC conversion circuit 20 so as to stop the drive of the motor 19.

Therefore, according to the present embodiment, even when the output of the motor 19 connected to the DC/AC conversion device 10 which is connected to the motor drive control system 1 is large, it is possible to avoid the situation where the AC/DC conversion circuit 12 is overloaded.

Note that, in order to shorten the processing time, the control circuit 16 enables supply of the direct-current voltage or the direct current from the AC/DC conversion circuit 12 to the DC/AC conversion circuit 20 instantaneously (for example, within a time period from several tens of milliseconds to several milliseconds) at the time of driving the motors 4, 5, and 6 when the terminal block 18 is electrically connected to the terminal block 25. In this case, even if the total of the outputs of the motors 4, 5, and 6 and the output of the motor 19 instantaneously exceeds the power which can be supplied from the AC/DC conversion circuit 12, there is no adverse effect due to the instantaneous overloaded state of the AC/DC conversion circuit 12.

Figure 2:
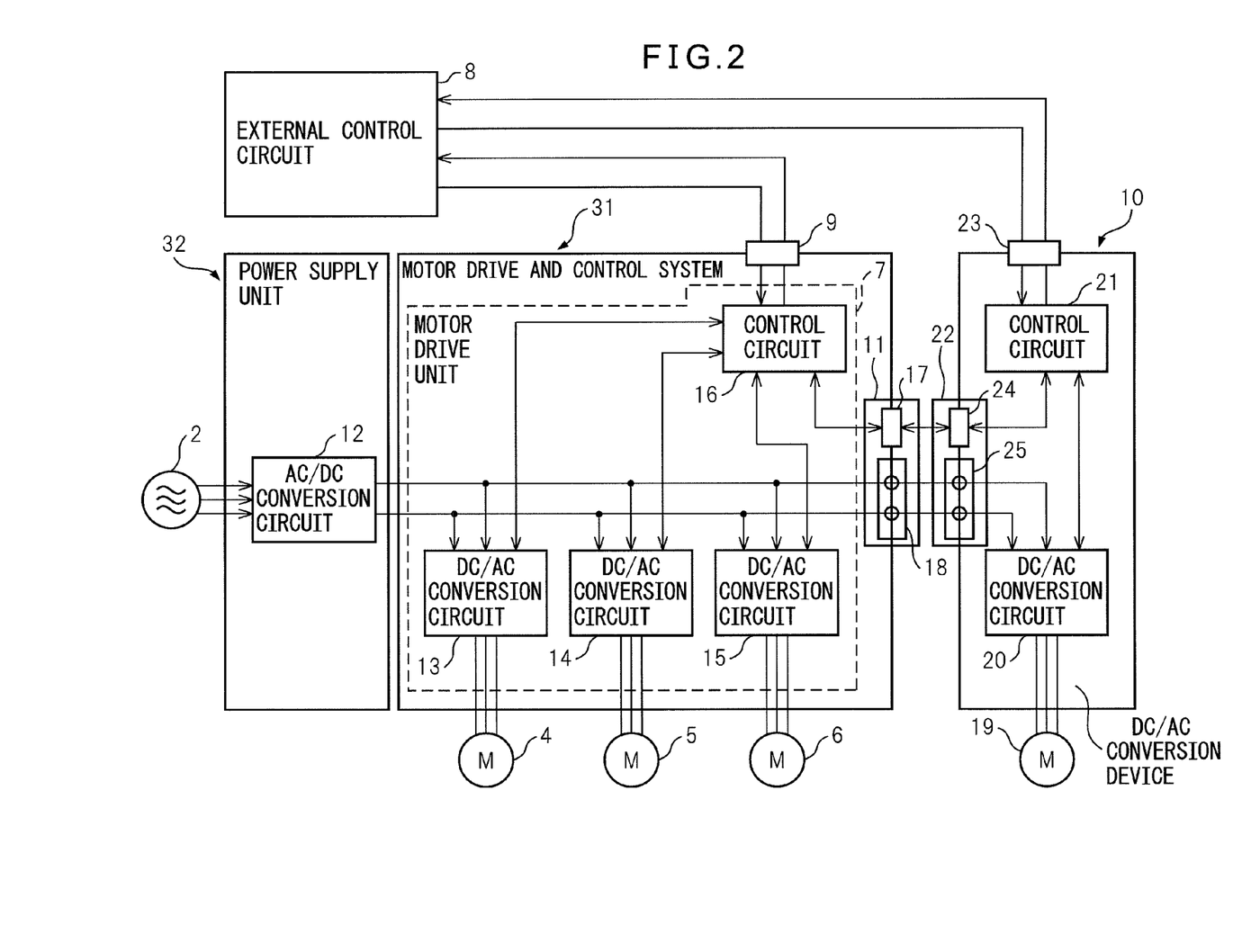
FIG. 2 is a block diagram of a second embodiment of a motor drive control system according to the present invention.

FIG. 2 is a block diagram of a second embodiment of a motor drive control system according to the present invention. In FIG. 2, a motor drive control system 31 has the motor drive unit 7, the communication port 9, and the connection unit 11. Note that, in FIG. 2, the three-phase alternating current power supply 2, the motors 4, 5, and 6, the motor drive unit 7, the external control circuit 8, the communication port 9, the DC/AC conversion device 10, the connection unit 11, the AC/DC conversion circuit 12, and the motor 19 are the same as the three-phase alternating current power supply 2, the motors 4, 5, and 6, the motor drive unit 7, the external control circuit 8, the communication port 9, the DC/AC conversion device 10, the connection unit 11, the AC/DC conversion circuit 12, and the motor 19 of the first embodiment which is shown in FIG. 1, respectively, so explanations thereof is omitted.

In the present embodiment, the power supply unit 32 which has the AC/DC conversion circuit 12 is provided at the outside of the motor drive control system 31. That is, the power supply unit 32 is configured by a module separate from the module which forms the motor drive control system 31.

According to the present embodiment, in the same way as the above first embodiment, when it is predicted that the total of the outputs of the motors 4, 5, 6, and 19 will exceed the power which can be supplied from the AC/DC conversion circuit 12, the control circuit 16 controls supply or stopping of the supply of the direct-current voltage or the direct current from the AC/DC conversion circuit 12 to the DC/AC conversion circuits 13, 14, 15, 20 while maintaining the total of the outputs of the motors 4, 5, 6, and 19 at a certain power not more than power which can be supplied from the AC/DC conversion circuit 12. Thereby, even when the output of the motor 19 which is connected to the DC/AC conversion device 10 which is connected to the motor drive control system 31 is large, it is possible to avoid the situation where the AC/DC conversion circuit 12 is overloaded.

Further, in the present embodiment as well, when the terminal block 18 is electrically to the terminal block 25, the control circuit 16 enable supply of the direct-current voltage or the direct current from the AC/DC conversion circuit 12 to the DC/AC conversion circuit 20 instantaneously (for example, in a time period from several tens of milliseconds to several milliseconds) at the time of driving the motors 4, 5, and 6.

Figure 3:
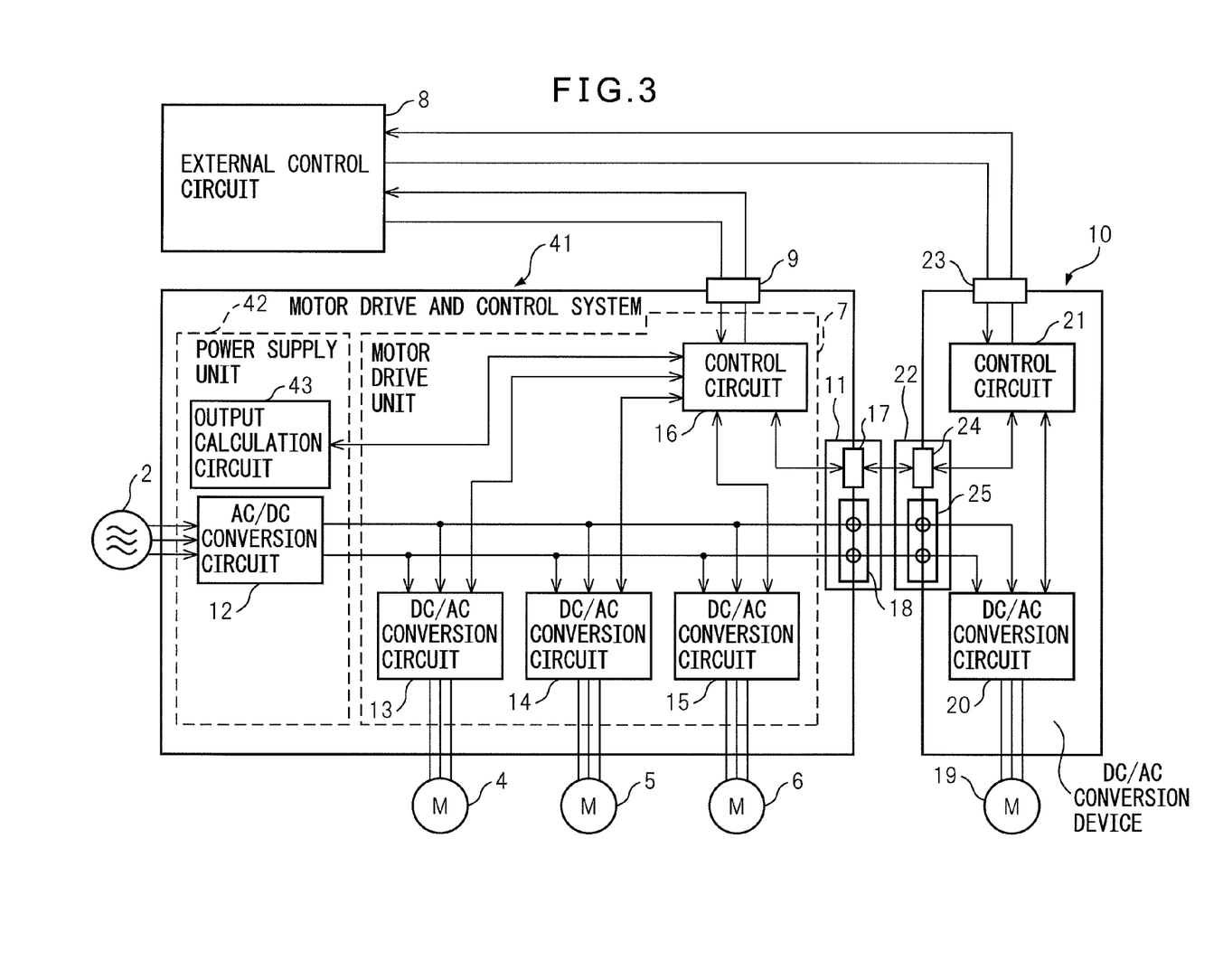
FIG. 3 is a block diagram of a third embodiment of a motor drive control system according to the present invention.

FIG. 3 is a block diagram of a third embodiment of a motor drive control system according to the present invention. In FIG. 3, a motor drive control system 41 has a power supply unit 42, the motor drive unit 7, the communication port 9, and the connection unit 11. Note that, in FIG. 3, the three-phase alternating current power supply 2, the motors 4, 5, and 6, the motor drive unit 7, the external control circuit 8, the communication port 9, the DC/AC conversion device 10, the connection unit 11, the AC/DC conversion circuit 12, and the motor 19 are the same as the three-phase alternating current power supply 2, the motors 4, 5, and 6, the motor drive unit 7, the external control circuit 8, the communication port 9, the DC/AC conversion device 10, the connection unit 11, the AC/DC conversion circuit 12, and the motor 19 of the first embodiment which is shown in FIG. 1, respectively, so explanations thereof is omitted. Further, in the present embodiment, the AC/DC conversion circuit 12 and the DC/AC conversion circuits 13, 14, and 15 are configured by a single module.

Further, in FIG. 3, the motors 4, 5, 6, and 19 have the same configuration as the motors 4, 5, 6, and 19 of the first embodiment which is shown in FIG. 1, but in the present embodiment, the motor 4 is a motor other than a spindle motor, the motors 5 and 6 are motors other than servo motors, and the motor 19 is a motor other than one of a motor for a rotary tool of a lathe which has one tool post and a motor for a back spindle or one of a motor for exchanging a tool of a machining center and a motor for exchanging a work pallet.

Furthermore, in FIG. 3, the control circuits 16 and 21 are configured the same as the control circuits 16 and 21 of the first embodiment which is shown in FIG. 1, but in the present embodiment, the control circuit 16, as explained later, monitors the operating states of the motors 4, 5, 6, and 19 and restricts the outputs of the motors 4, 5, 6, and 19 based on the operating states of the motors 4, 5, 6, and 19.

According to the present embodiment, when the terminal block 18 is electrically connected to the terminal block 25, the control circuit 16 predicts the total of the outputs of the motors 4, 5, 6, and 19 based on the operating states of the motors 4, 5, 6, and 19. To do this, the power supply unit 43 has an output calculation circuit 43 in addition to the AC/DC conversion circuit 12. The output calculation circuit 43 is supplied with status signals of the motors 4, 5, 6, and 19 from the DC/AC conversion circuits 13, 14, 15, and 20 through the control circuit 16 and calculates the predicted outputs of the motors 4, 5, 6, and 19 based on the status signals. Then, the output calculation circuit 43 supplies the information regarding the calculated predicted outputs of the motors 4, 5, 6, and 19 to the control circuit 16. Note that, the output calculation circuit 43 may also be provided at the control circuit 7. In this case, information relating to the power which can be supplied from the AC/DC conversion circuit 12 is supplied from the power supply unit 42 to the control circuit 7.

The control circuit 16 predicts the total of the outputs of the motors 4, 5, 6, and 19 based on the predicted outputs of the motors 4, 5, 6, and 19 which are supplied from the output calculation circuit 43. Then, the control circuit 16 compares the total of the predicted outputs of the motors 4, 5, 6, and 19 with the power which can be supplied from the AC/DC conversion circuit 12. If it is predicted that the total of the outputs of the motors 4, 5, 6, and 19 will exceed the power which can be supplied from the AC/DC conversion circuit 12, the control circuit 16 controls supply or stopping of the supply of the direct-current voltage or the direct current from the AC/DC conversion circuit 12 to the DC/AC conversion circuits 13, 14, 15, and 20 while maintaining the total of the outputs of the motors 4, 5, 6, and 19 at a certain power not more than power which can be supplied from the AC/DC conversion circuit 12. To do this, the control circuit 16 controls the supply of the direct-current voltage or the direct current to the DC/AC conversion circuits 13, 14, 15, and 20 so as to restrict at least one output of the motors to be driven (for example, the motors 4, 5, 19) among the motors 4, 5, 6, and 19.

In order to restrict at least one of the outputs of the motors 4, 5, 6, and 19, if it is predicted that the total of the outputs of the motors 4, 5, 6, and 19 will exceed the power which can be supplied from the AC/DC conversion circuit 12, the control circuit 16 selects the motor which the output is restricted in accordance with output control rules preset in the control circuit 16 or commands from the operating unit (not shown).

In the case where the motors to be driven are the motors 4, 5, 6, and 19 and the output of the motor 19 is larger than the total of the outputs of the motors 4, 5, and 6, so it is predicted that the total of the outputs of the motors 4, 5, 6, and 19 will exceed the power which can be supplied from the AC/DC conversion circuit 12, the control circuit 16 performs control to supply the direct-current voltage or the direct current to the DC/AC conversion circuits 13, 14, and 15 while maintaining the outputs of the motors 4, 5, and 6 at the normal outputs (the outputs generated when the total of the outputs of the motors 4, 5, 6, and 19 is a certain power not more than power which can be supplied from the AC/DC conversion circuit 12) and performs control to supply the direct-current voltage or the direct current to the DC/AC conversion circuit 20 so as to restrict the output of the motor 19 to an output which is lower than normal output (for example, output of 80% of normal output).

Note that, in the case where the motors to be driven are the motors 4, 5, 6, and 19 and the output of the motor 19 is larger than the total of the outputs of the motors 4, 5, and 6, so it is predicted that the total of the outputs of the motors 4, 5, 6, and 19 will exceed the power which can be supplied from the AC/DC conversion circuit 12, the control circuit 16 can also perform control so as to supply the direct-current voltage or the direct current to the DC/AC conversion circuit 20 so as to restrict the outputs of the motors 4, 5, 6, and 19 to outputs lower than normal outputs by the same ratio (for example, to outputs of 90% of the normal outputs).

Therefore, according to the present embodiment, even if the output of the motor 19 connected to the DC/AC conversion device 10 which is connected to the motor drive control system 1 is large, it is possible to avoid the situation where the AC/DC conversion circuit 12 is overloaded and it is possible to secure outputs of the motors 4, 5, 6, and 19 in accordance with the operating states of the motors 4, 5, 6, and 19.

Figure 4:
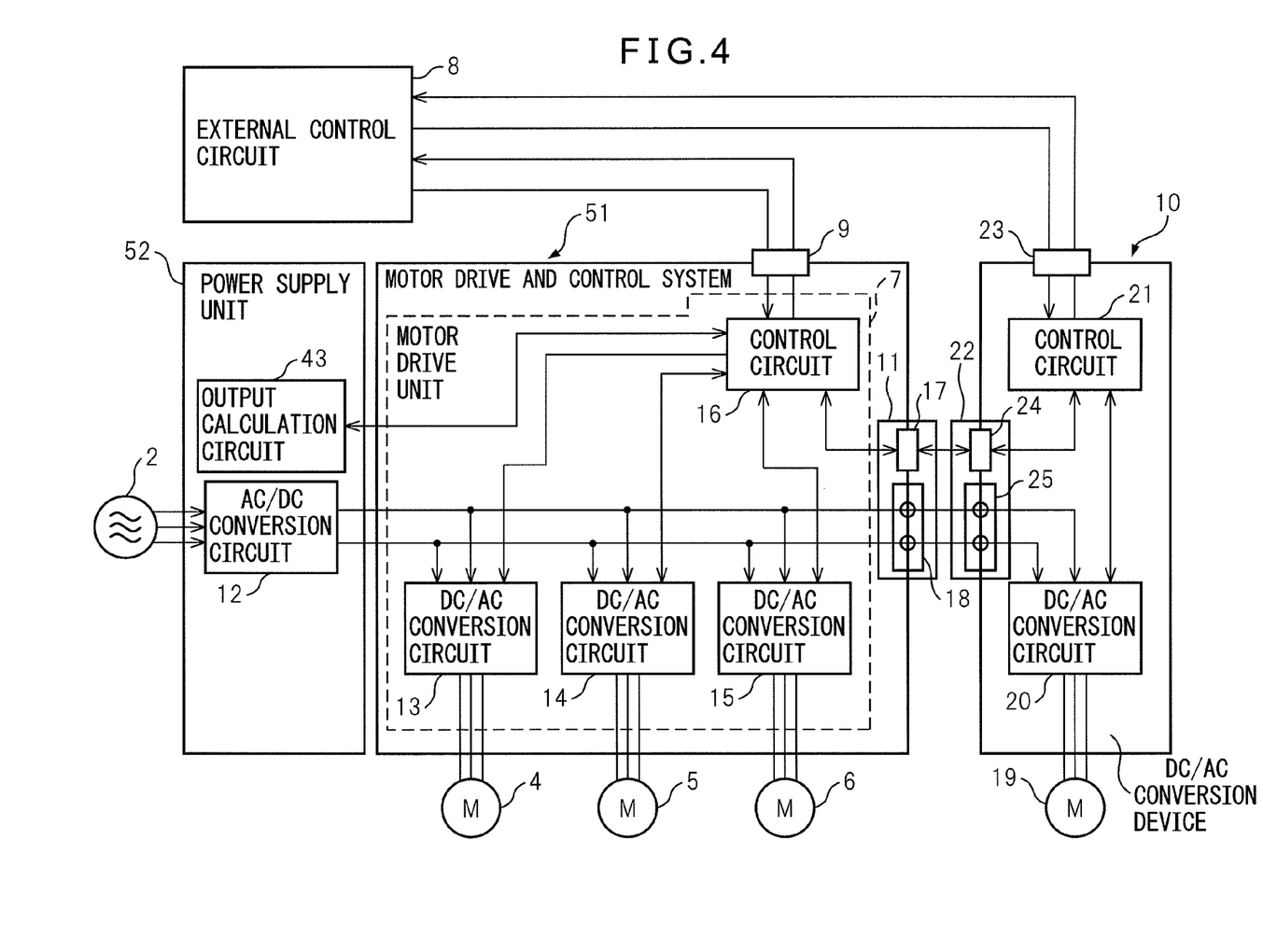
FIG. 4 is a block diagram of a fourth embodiment of a motor drive control system according to the present invention.

FIG. 4 is a block diagram of a fourth embodiment of a motor drive control system according to the present invention. In FIG. 4, the motor drive control system 51 has the motor drive unit 7, the communication port 9, and the connection unit 11. Note that, in FIG. 4, the three-phase alternating current power supply 2, the motors 4, 5, and 6, the motor drive unit 7, the external control circuit 8, the communication port 9, the DC/AC conversion device 10, the connection unit 11, the AC/DC conversion circuit 12, and the motor 19 are the same as the three-phase alternating current power supply 2, motors 4, 5, and 6, motor drive unit 7, outside control circuit 8, communication port 9, DC/AC conversion device 10, connection unit 11, AC/DC conversion circuit 12, and motor 19 of the first embodiment which is shown in FIG. 1, respectively, so explanations thereof is omitted. Further, in the present embodiment, the AC/DC conversion circuit 12 and the DC/AC conversion circuits 13, 14, and 15 are configured as separate modules.

In the present embodiment, the power supply unit 52 which has the AC/DC conversion circuit 12 and the output calculation circuit 43 is provided at the outside of the motor drive control system 51. That is, the power supply unit 52 is configured by a separate module from the module forming the motor drive control system 51.

According to the present embodiment, in the same way as the above third embodiment, in order to restrict at least one of the outputs of the motors 4, 5, 6, and 19, if it is predicted that the total of the outputs of the motors 4, 5, 6, and 19 will exceed the power which can be supplied from the AC/DC conversion circuit 12, the control circuit 16 selects the motor which the output is restricted in accordance with output control rules preset in the control circuit 16 or commands from the operating unit (not shown).

Therefore, even when the power supply unit 52 is configured by a module separate from the module forming the motor drive control system 51, it is possible to avoid the situation where the AC/DC conversion circuit 12 is overloaded when the output of the motor 19 connected to the DC/AC conversion device 10 which is connected to the motor drive control system 1 is large, and it is possible to secure outputs of the motors 4, 5, 6, and 19 in accordance with the operating states of the motors 4, 5, 6, and 19.

The present invention is not limited to the above embodiments, and various changes or modifications may be made. For example, a three-phase alternating current power supply 2 is used as the commercial alternating current power supply, but a multiphase other than three-phase alternating current power supply may also be used as the commercial alternating current power supply. Further, as the first number of motors, the case of driving three motors 4, 5, and 6 is explained, but the present invention can be applied even when driving any other number than three of motors. Furthermore, the cases of connecting the second number of DC/AC conversion devices, that is, the single DC/AC conversion circuit 20 as a second direct current/alternating current conversion circuit, to the motor drive control systems 1, 31, 41, and 51, are explained, but the present invention may also be applied to cases when connecting a plurality of DC/AC conversion circuits 20 to the motor drive control systems 1, 31, 41, and 51.

While the invention has been described with reference to specific preferred embodiments, it will be understood, by those skilled in the art, that various changes or modifications may be made thereto without departing from the scope of the following claims.

The invention claimed is:

1. A motor drive control system connected to an alternating current/direct current conversion circuit which converts alternating-current voltage or alternating current to direct-current voltage or direct current, comprising:
   a first number of first direct current/alternating current conversion circuits to which direct-current voltage or direct current is supplied from said alternating current/direct current conversion circuit, which convert the supplied direct-current voltage or the supplied direct current to alternating-current voltage or alternating current, and which supply the converted alternating-current voltage or the supplied alternating current to a first number of motors;
   a connection unit which enables connection of a second number of second direct current/alternating current conversion circuits which convert direct-current voltage or direct current to alternating-current voltage or alternating current and which supply the converted alternating-current voltage or the converted alternating current to a second number of motors so that said alternating current/direct current conversion circuit enables supply of direct-current voltage or direct current to at least one of at least one first direct current/alternating current conversion circuit and at least one second direct current/alternating current conversion circuit; and
   a control circuit which controls supply or stop of the supply of direct-current voltage or direct current from said alternating current/direct current conversion circuit to said first number of first direct current/alternating current conversion circuits and said second number of second direct current/alternating current conversion circuits while maintaining the total of said outputs of the first number of motors and said outputs of the second number of motors at a certain power not more than power which can be supplied from said alternating current/direct current conversion circuit in the case where it is predicted that the total of said outputs of the first number of motors and said outputs of the second number of motors, when at least one second direct current/alternating current conversion circuit is connected to said connection unit, will exceed the power which can be supplied from said alternating current/direct current conversion circuit.

2. A motor drive control system as set forth in claim 1, wherein in the case where it is predicted that the total of said outputs of the first number of motors and said outputs of the second number of motors, when said at least one second direct current/alternating current conversion circuit is connected to said connection unit, will exceed the power which can be supplied from said alternating current/direct current conversion circuit, said control circuit stops the supply of direct-current voltage or direct current to at least one of said at least one first direct current/alternating current conversion circuit and said at least one second direct current/alternating current conversion circuit to which motors to be driven among said first number of motors and said second number of motors are connected.

3. A motor drive control system as set forth in claim 1, wherein in the case where it is predicted that the total of said outputs of the first number of motors and said outputs of the second number of motors, when said at least one second direct current/alternating current conversion circuit is connected to said connection unit, will exceed the power which can be supplied from said alternating current/direct current conversion circuit, said control circuit controls the supply of direct-current voltage or direct current so as to restrict at least one output of motors to be driven among said first number of motors and said second number of motors.

4. A motor drive control system as set forth in claim 2, wherein when said at least one second direct current/alternating current conversion circuit is connected to said connection unit, said control circuit predicts the total of said outputs of the first number of motors and said outputs of the second number of motors based on a position command, a rotational speed command, or a torque command for said first number of motors and a position command, a rotational speed command, or a torque command for said second number of motors from a device at the outside of said motor drive control system.

5. A motor drive control system as set forth in claim 3, wherein when said at least one second direct current/alternating current conversion circuit is connected to said connection unit, said control circuit predicts the total of said outputs of the first number of motors and said outputs of the second number of motors based on the operating states of said first number of motors and said second number of motors.

* * * * *